Jan. 16, 1934.  F. F. CLARKE  1,943,290
AIRCRAFT
Filed July 9, 1932  2 Sheets-Sheet 1

INVENTOR
Frank F. Clark
BY
ATTORNEY

Jan. 16, 1934.  F. F. CLARKE  1,943,290
AIRCRAFT
Filed July 9, 1932  2 Sheets-Sheet 2
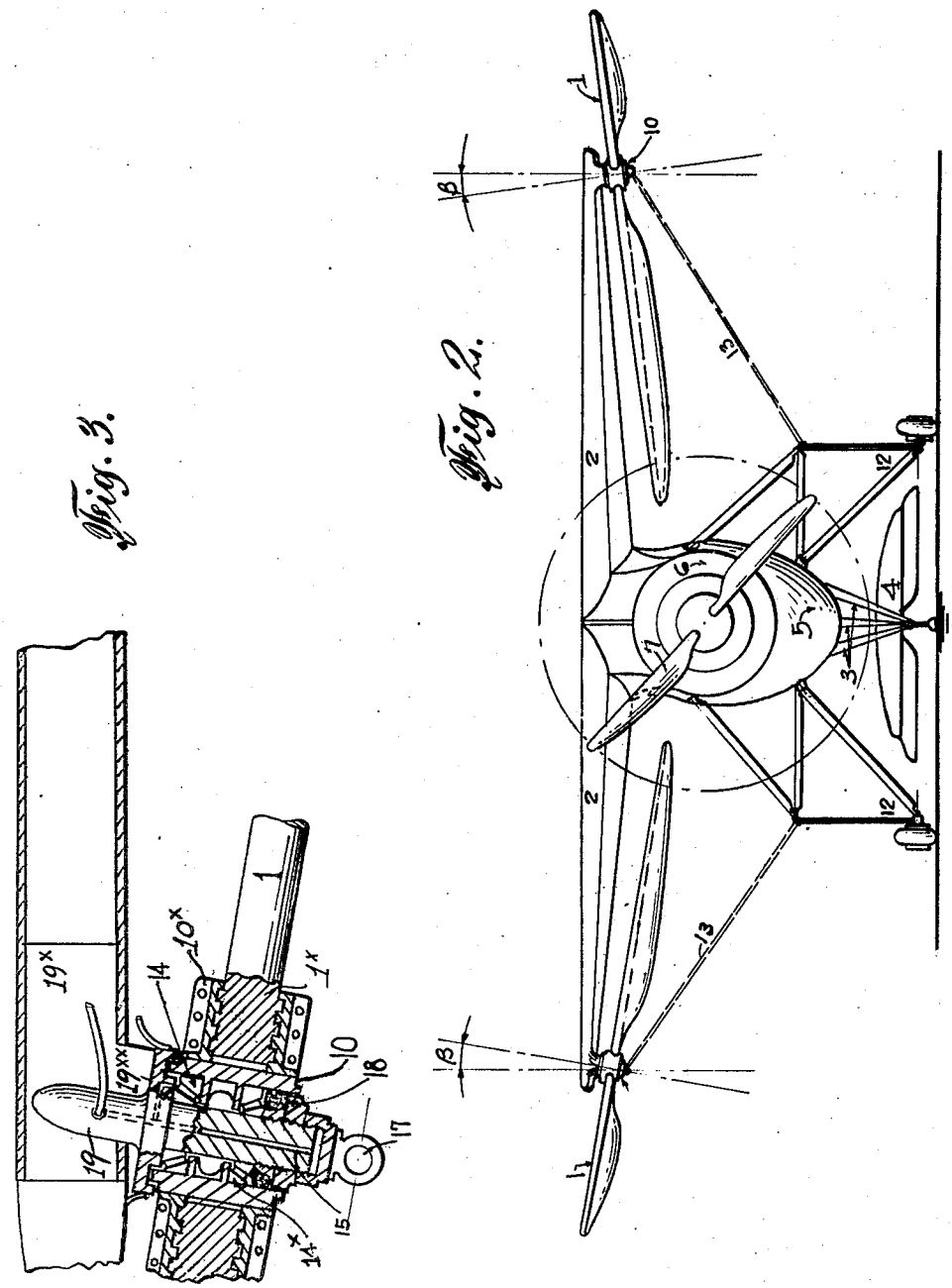
INVENTOR
Frank F. Clarke
BY
ATTORNEY Patented Jan. 16, 1934

1,943,290

UNITED STATES PATENT OFFICE 1,943,290

AIRCRAFT

Frank F. Clarke, New York, N. Y.

Application July 9, 1932. Serial No. 621,611

1 Claim. (Cl. 244—15)

The object of the present invention is to provide an airplane so provided with horizontally disposed independently rotating vanes that greater stabilization and resistance against spinning or stalling is provided, as compared with helicopters and other prior aircraft constructions, including those types which have rotary vanes disposed laterally of the fuselage, for example, at the ends of the primary wing.

The invention will be described with reference to the accompanying drawings in which Fig. 1 is a plan view of an embodiment of the invention.

Fig. 2 is a front end elevation of the said embodiment.

Fig. 3 is a fragmentary view of the wing structure at one end thereof, and the supporting elements for a multi-vane rotor.

Figure 1:
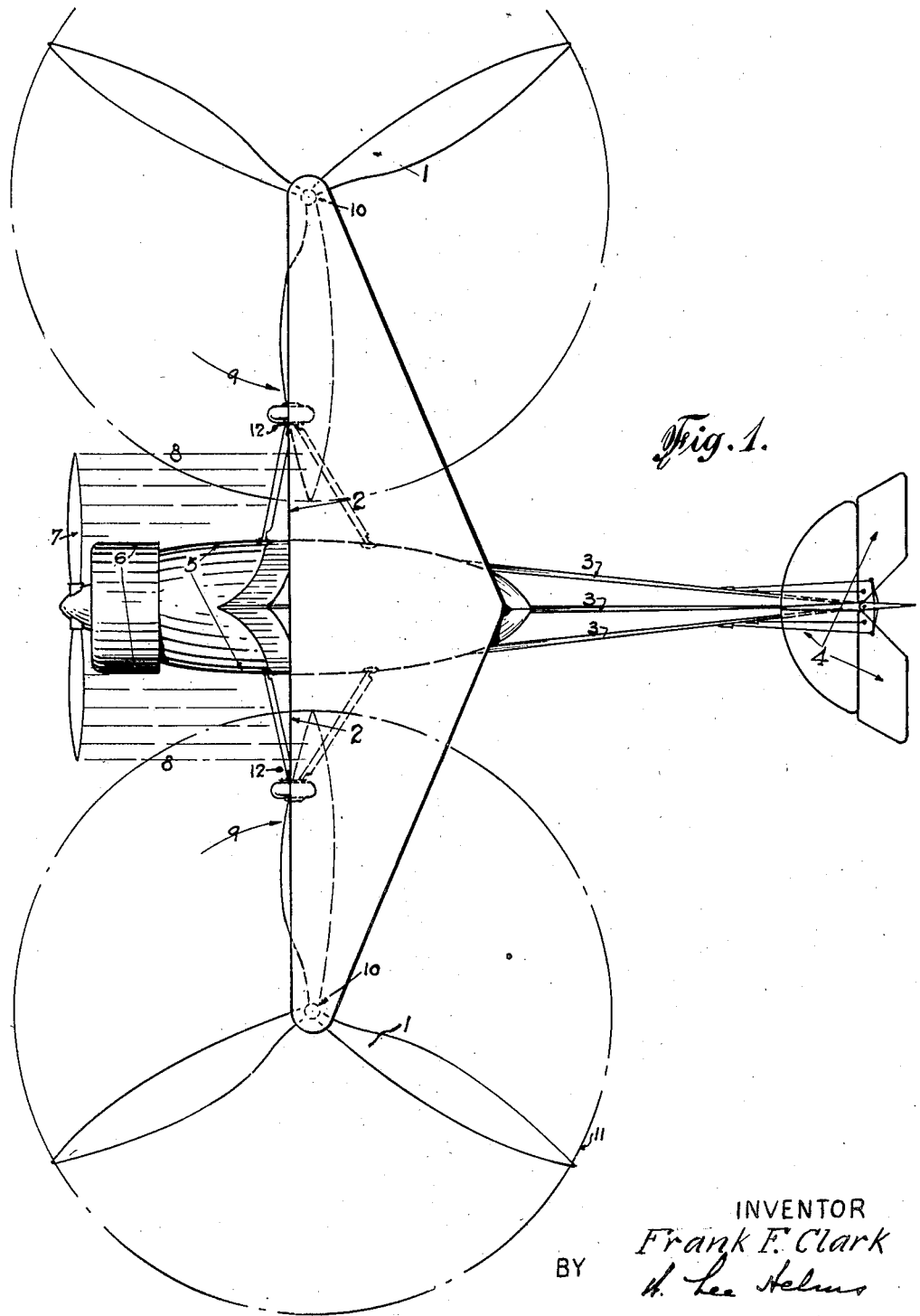

Referring to the drawings, I have shown therein, a monoplane structure comprising a fuselage carrying a forward motor and propeller, a usual combination formed of vertical horizontal rudders and ailerons, a stub airplane wing being mounted upon the fuselage.

At each end of the wing 2 is carried a freely rotating multi-vane rotor 1.

In the drawings I have indicated the rudders and ailerons carried by cantilever struts or outriggers 3 connected to the rear of the fuselage 5. The engine hood is indicated at 6 and the propeller at 7. The rudders and ailerons are indicated at 4.

The air stream from propeller 7 is indicated by the dotted line 8 and it will be noted that the ends of the rotor vanes are within said airstream, its force tending to rotate the rotors in the direction indicated by arrows 9.

Reference to Fig. 3 will show a suitable mounting for the rotors. Secured at the end of the wing is a forging comprising the bracket plate 19x and shaft 19 preferably formed integrally therewith.

Shaft 19 is formed near its upper end with a lateral flange head 19xx below which is disposed a bearing 14 for the hub. Hub 10 of the rotor is fitted upon shaft 19 and the hub receives bearing 14 which lies immediately above an inwardly projected flange of the hub.

Below the lateral flange is a second inwardly projected flange which has disposed below it a bearing 14x. The lower end of the shaft is threaded to receive rings which hold in place washers such as 18 for preventing oil from spreading out of the rotating unit at the lower end thereof, the rings being held in position by a collar 17 threaded upon the lower end of the shaft.

The hub is provided with three radially extending semi-circular and internally flanged housings 10x for the hubs 1x of the vanes 1. Each semi-circular housing is provided with apertured laterally extending seats to receive semi-circular housing caps formed with similar apertured seats for abutment with the first-named seats, the two being apertured to receive bolts by which they are secured together for holding the vane, in each case, in place.

It is to be noted by reference to Fig. 3, that collar 17 not only holds in place rings above it, but through said rings, holds in position the lower bearing member 14x.

Shaft 19 is formed with a longitudinal oil channel 15 having one or more lateral ducts extending through the shaft transversely and in register with the bearings for lubricating the same.

It is to be noted that collar 17 is formed at its lower end with a ring to which a brace may be secured, the brace being indicated in Fig. 2, at 13. The brace is not essential, but may be desirable in some cases.

It will be noted that each shaft 19 lies at an angle with respect to the longitudinal axis of the wing section which carries it. In other words, the vanes of the rotor are tilted with respect to the wing which tends to stabilize the airplane while in flight. When the airplane turns in flight, one rotor moves forward faster than the other and the tilt of the rotors on the leading vane tends to automatically bank the airplane. Upon straightening out the airplane the two rotors, having converging axes, tend to cause the airplane to slip back into normal relatively horizontal flying position.

It is to be noted that the rotors not only lie within the airstream from the propeller, as to the tips of the vanes, but they are freely rotatable not being connected to power-rotation devices.

Furthermore, the vanes ascribe a path, in rotation, extending a substantial distance beyond the ends of the wing, that path of rotation lying angularly with respect to the longitudinal axis of the wing. The rotors being disposed under the wings and exerting a positive thrust downward against free air, they can be mounted on short or stub shafts and relatively close to the under surface of the wing, thus enabling a rigid and strong mounting as contrasted with the mounting required when the rotors are placed above the wing. In the latter case, a positive thrust is exerted upon the wing tending to force the plane downward.

Having described my invention, what I claim and desire to secure by Letters Patent, is as follows:—

In an airplane, a fuselage, a wing extending transversely of the fuselage, a propeller carried by the fuselage and power means for rotating the same, a relatively short shaft carried by each wing near the end thereof and depending from the wing said shaft being mounted angularly with respect to the longitudinal axis of the wing, a freely rotatable rotor comprising a plurality of vanes carried by each shaft, the vanes being of such length as to extend within the airstream from the propeller rearwardly thereof and to extend substantially beyond the end of the wing, in each case, during rotation.

FRANK F. CLARKE.